US009215690B2

(12) United States Patent
Kottkamp et al.

(10) Patent No.: US 9,215,690 B2
(45) Date of Patent: Dec. 15, 2015

(54) METHOD AND A BASE STATION FOR PRIORITIZING MOBILE TERMINALS

(75) Inventors: Meik Kottkamp, Munich (DE); Juergen Schlienz, Poing (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 237 days.

(21) Appl. No.: 13/881,026

(22) PCT Filed: Oct. 26, 2011

(86) PCT No.: PCT/EP2011/068739
§ 371 (c)(1),
(2), (4) Date: Apr. 23, 2013

(87) PCT Pub. No.: WO2012/065818
PCT Pub. Date: May 24, 2012

(65) Prior Publication Data
US 2013/0208647 A1    Aug. 15, 2013

(30) Foreign Application Priority Data

Nov. 15, 2010  (DE) .......................... 10 2010 051 431

(51) Int. Cl.
*H04H 20/71*  (2008.01)
*H04W 72/00*  (2009.01)
*H04W 74/08*  (2009.01)

(52) U.S. Cl.
CPC ............ *H04W 72/005* (2013.01); *H04W 74/08* (2013.01); *H04W 74/0875* (2013.01)

(58) Field of Classification Search
CPC ...................................................... H04W 72/00
USPC ........................................................... 370/312
See application file for complete search history.

(56) References Cited

U.S. PATENT DOCUMENTS

| 6,400,695 | B1 | 6/2002 | Chuah et al. |
| 7,990,927 | B2 | 8/2011 | Choi et al. |
| 2006/0111104 | A1 | 5/2006 | Hyslop |
| 2008/0200146 | A1 | 8/2008 | Wang et al. |

(Continued)

FOREIGN PATENT DOCUMENTS

| CN | 101330313 A | 12/2008 |
| CN | 101730233 A | 6/2010 |

(Continued)

OTHER PUBLICATIONS

International Search Report issued in corresponding application No. PCT/EP2011/068739 mailed Feb. 28, 2012.

(Continued)

*Primary Examiner* — Shripal Khajuria
(74) *Attorney, Agent, or Firm* — Carter, DeLuca, Farrell & Schmidt, LLP

(57) ABSTRACT

A method for reducing collisions during the initial access by a plurality of mobile-terminal devices to a base station which comprises a control unit, wherein the control unit administers at least one random-access resource, wherein the method contains the following method steps:
  setting ($S_1$) by the control unit of a priority which specifies which mobile-terminal device is allowed to connect to the at least one random-access resource;
  broadcast ($S_2$) of the priority by the base station on at least one known channel.

20 Claims, 3 Drawing Sheets

(56) References Cited

U.S. PATENT DOCUMENTS

| | | |
|---|---|---|
| 2010/0120426 A1 | 5/2010 | Singh et al. |
| 2010/0216453 A1* | 8/2010 | Kallin et al. ........... 455/424 |

FOREIGN PATENT DOCUMENTS

| | | |
|---|---|---|
| EP | 1 901 574 A1 | 3/2008 |
| WO | 2008/115486 A1 | 9/2008 |

OTHER PUBLICATIONS

Norp, Toon, "Mobile Network Improvements for Machine Type Communications", ETSI M2M Workshop, Oct. 2010.

"System Improvements for Machine-Type Communications", Norm 3GPP TR 23.888 V1.0.0, Jul. 2010.

* cited by examiner

METHOD AND A BASE STATION FOR PRIORITIZING MOBILE TERMINALS

LTE base stations are installed not only in cities and areas with a high population; they are also primarily supposed to allow broadband access to communications networks such as the Internet in rural areas. Dependent upon the available spectral bandwidth, speeds of faster than 100 Mbit/s in the downlink (German: Abwärtspfad) and more than 50 Mbits/s in the uplink (German: Aufwärtspfad) can be achieved. Such high speeds, which have hitherto been unavailable in many regions, now open up new possibilities for future applications. Particularly machine-to-machine communication (also referred to as M2M communication) will achieve fast growth rates in future. In addition to automatic ticket machines and drinks dispensers, electricity meters and gas meters can also be connected to a superordinate control system, in order to transmit filled levels and/or consumption values approximately in real-time. The number of such mobile-terminal devices which access an LTE base station is therefore no longer composed exclusively of mobile telephones, which are operated by a user, but increasingly also includes modem and data cards, which are integrated in autonomous systems. In view of the anticipated increase in the number of mobile subscribers within an LTE network, the probability of collisions in the case of an initial access by these mobile-terminal devices to an LTE base station will also rise.

A device and a method for identifying collisions between different mobile-terminal devices in the event of an initial access to the base station is known from EP 1 901 574 A1.

The disadvantage with EP 1 901 574 A1 is that the collisions in the case of an initial access to an LTE base station by different mobile-terminal devices can in fact be detected, but no reliable means for reducing these collisions is provided. Especially in cases in which a large number of mobile-terminal devices which are used for M2M communication seek access to an LTE base station, the resulting collisions with mobile-terminal devices which are assigned to different users lead to a situation in which communications access for these users is considerably restricted or no longer possible at all.

The object of the invention is therefore to provide a base station and a method for a base station, which reliably reduces the occurrence of collisions in the case of an initial access by a plurality of mobile-terminal devices.

The object is achieved with regard to the method for the base station by the features of claim 1 and with regard to the base station by the features of claim 11. The dependent claims specify advantageous further developments of the method according to the invention for a base station and for the base station according to the invention.

The method according to the invention for reducing collisions in the case of an initial access by a plurality of mobile-terminal devices to a base station which provides a control unit, wherein the control unit administers at least one random-access resource, provides the following method steps. In a first method step, a priority is set by the control unit, wherein the priority specifies which mobile-terminal device is allowed to connect to the at least one random-access resource. In a second method step, the priority is broadcast by the LTE base station on at least one known channel.

With the method according to the invention, it is particularly advantageous that a priority is set by the control unit, wherein the priority specifies which mobile-terminal device is allowed to connect to the at least one random-access resource, and that this priority is broadcast by the base station on at least one known channel. Since the priority is broadcast on at least one known channel, it is received by the mobile-terminal devices. Dependent upon the priority received, the mobile-terminal devices then connect to at least one random-access resource or they wait until the priority is lowered, in order to connect to the at least one random-access resource in the subsequent course of events. The number of mobile-terminal devices which would like to connect to the at least one random-access resource can accordingly be lowered, thereby also reducing the number of collisions in the case of an initial access to a base station by the mobile-terminal devices.

The base station according to the invention for reducing collisions in the case of an initial access by a plurality of mobile-terminal devices comprises a control unit, wherein the control unit administers at least one random-access resource, wherein a priority which specifies which mobile-terminal device is allowed to connect to the at least one random-access resource can be set by the control unit, and wherein the priority can be broadcast by the base station on at least one known channel.

It is particularly advantageous that a control unit within the LTE base station can set a priority, wherein the priority specifies which mobile-terminal device is allowed to connect to the at least one random-access resource, and wherein the priority can be broadcast by the LTE base station on at least one known channel.

The invention in fact relates primarily to LTE base stations, but can also be used for base stations of other mobile radio standards. Accordingly, the discussion below relates to LTE base stations without restriction of generality.

Since the priority can be broadcast by the LTE base station on at least one known channel, it can be received by all mobile-terminal devices. On the basis of the priority received, all mobile-terminal devices can now check whether they are allowed to access the at least one random-access resource or whether they must wait until the priority has been lowered accordingly. In this manner, the number of simultaneous initial accesses by the mobile-terminal devices can be lowered, so that the probability of collisions is reduced as a result.

A further advantage of the method according to the invention is achieved if the priority is raised whenever, by comparison with the free random-access resources, many mobile-terminal devices access the LTE base station and/or many collisions occur, and/or if the priority is lowered whenever, by comparison with the free random-access resources, few mobile-terminal devices access the LTE base station and/or few collisions occur. In this context, it is advantageous that the priority can be adjusted dynamically to correspond with the respective situation. As a result, the free random-access resources can be exploited in an optimal manner, wherein the probability for the occurrence of collisions is lowered at the same time.

One further advantage of the method according to the invention is achieved if the priority is broadcast via an existing or newly created system information block, wherein the existing or newly created system information block is transmitted on a common downlink channel. Because every mobile-terminal device receives the transmitted information in the system information block before the initial access to an LTE base station, this ensures that the mobile-terminal device accesses an LTE base station only when the priority allows this.

Moreover, an advantage is achieved with the method according to the invention, if the control unit raises or reduces the number of random-access resources. As soon as the frequency of collisions rises, the control unit can increase the priority and at the same time also enlarge the random-access resources, so that, simultaneously, more mobile-terminal devices can access an LTE base station, and the overall probability for collisions is reduced.

Finally, an advantage is achieved with the method according to the invention if the control unit raises or reduces the priority on the basis of experimental values and/or by evaluating status information, wherein the status information relates to incidents such as power failures or the restarting of the LTE base station. In particular, status information, such as power failures or the restarting of a dedicated base station cause a plurality of mobile-terminal devices suddenly to perform an initial access to the LTE base station. If such status information has already been evaluated by the control unit in advance, the priority can be increased even before the plurality of mobile-terminal devices attempts to connect to the LTE base station in an initial access.

A further advantage of the LTE base station according to the invention is achieved if the priority can be reduced by the control unit at a given time, especially during the night, and/or if the priority can be raised by the control unit at a given time, especially during the daytime. This ensures that mobile-terminal devices, which are used primarily for M2M communication, can access the LTE base station only when few mobile-terminal devices which are assigned to normal users are connected to the LTE base station. The automated reading, for example, of electricity meters, is therefore displaced to a time during which the LTE base station is subject to a reduced loading. In this manner, use of the resources of the LTE base station is distributed uniformly over the entire day, which means that an adequate number of free random-access resources are available, particularly during peak loading times.

Additionally, with the LTE base station according to the invention, an advantage is achieved if the priority class of mobile-terminal device can be altered by the LTE base station as soon as it is connected to the LTE base station. In the case of major events, for example, sporting events, very large numbers of mobile-terminal devices are sometimes disposed in a very small geographical area, which is then often supplied only by a single LTE base station. Although, in this case, the mobile-terminal devices are primarily assigned to normal users, there may be an increased probability of collisions because of the large number of mobile-terminal devices. It is therefore advantageous if the priority class of a mobile-terminal device can be altered by the base station, as soon as it is connected to the LTE base station. If a mobile-terminal device has been able to connect to the LTE base station because of its membership of a high priority class, the LTE base station can then assign this mobile-terminal device to a relatively lower priority class, so that, in the case of a subsequent attempt to connect, another mobile-terminal device, which was disadvantaged in the previous attempt to connect, is given precedence. This ensures that, on average, all mobile-terminal devices which are assigned to a normal user can access an LTE base station with a similar level of probability.

Finally, an advantage is achieved with the LTE base station according to the invention if those mobile-terminal devices which interact directly with the user are assigned to a relatively higher priority class than mobile-terminal devices which are used for M2M communication. As a result, users receive an advantage in peak loading times, because autonomous systems, such as, electricity meters, can generally also transmit their information at another time.

Various exemplary embodiments of the invention are described by way of example below with reference to the drawings. Identical subject matters provide the same reference numbers. In detail, the corresponding figures of the drawings are as follows.

Figure 1:
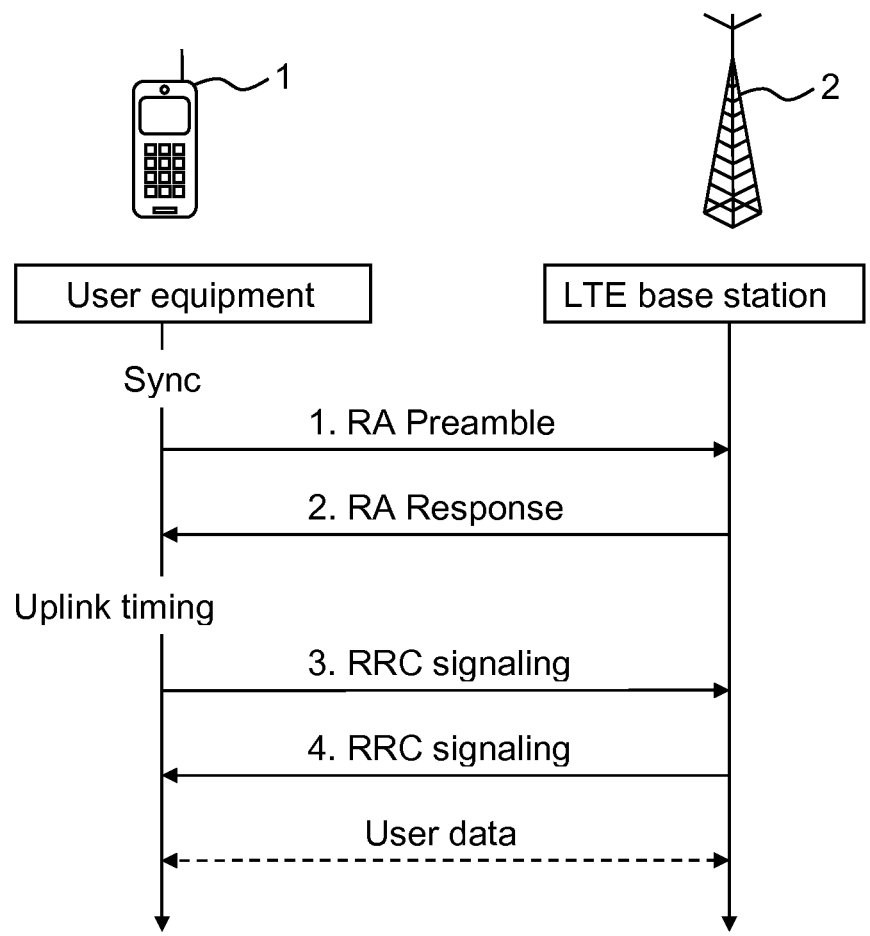
FIG. 1 shows an exemplary embodiment of a simplified flow diagram for an initial access to an LTE base station by a mobile-terminal device.

FIG. 1 shows an exemplary embodiment of a flow diagram which explains the initial access to a base station 2 by a mobile-terminal device 1. Such an initial access to the LTE base station 2 by the mobile-terminal device 1 is implemented, for example, after the mobile-terminal device 1 has been switched on. The mobile-terminal device 1 is also referred to as User Equipment (UE) (German: Nutzer Gerät), and the LTE base station 2 is also referred to as an eNodeB. As soon as the mobile-terminal device 1 is switched on, it implements a search for an appropriate LTE base station 2. The mobile-terminal device 1 also implements this search during operation, so that it can change to a more favourable base station 2 if required.

As soon as the mobile-terminal device 1 has discovered an LTE base station 2 in a given frequency range, it begins to synchronise with the LTE base station 2. For this purpose, it must register the identity of the bit-transmission layer of the LTE base station 2. In total, there are 504 different identities, which the mobile-terminal device 1 can distinguish on the basis of a first and a second synchronisation signal, which is transmitted from the LTE base station 2. Following this, the frame timing (English: frame timing) of the LTE base station 2 is determined. As soon as this has been completed, the system information (English: system information) of the LTE base station 2 can be read. This information is necessary so that a mobile-terminal device 1 can access the LTE base station 2 and operate correctly within the latter. Accordingly, this information is transmitted at regular intervals via a broadcast (German: Rundsendung) to all terminal devices 1. The system information provides inter alia details of the bandwidth of the downlink and uplink, or their configuration in the case of a TDD (English: time division duplex; German: Zeitduplex), and also contains extensive parameters, for example, regarding how the random-access resources are to be used, or relating to the power control as well as many other details.

The system information is subdivided into different blocks and transmitted to the mobile-terminal devices. At present, one MIB (English: master information block; German Masterinformationsbereich) and 13 SIBs (English: system information block; German Systeminformationsbereich), SIB1 to SIB13, are defined in the 3GPP standard for LTE (English: 3rd Generation Partnership Project; German: partnerschaftliches Projekt der dritten Generation). The MIB and also the 13 SIBs relate to the BBCH (English: broadcast control channel; Germann: Rundsendungskontrollkanal), which is a logical channel (English: logical channel). The MIB is then copied to the BCH (English: broadcast channel; German: Rundsendungskanal), whereas the 13 SIBs are copied to the DL-SCH (English: downlink shared channel; German: gemeinsamer Downlinkkanal). The BCH and the DL-SCH are transport channels (English: transport channel). The BCH is copied to the PBCH (physical broadcast channel; German: physikalischer Rundsendungskanal), and the DL-SCH is copied to the PDSCH (English: physical downlink shared channel; German: gemeinsamer physikalischer Downlinkkanal).

The MIB contains just sufficient information to allow the mobile-terminal device 2 to decode the further SIBs. The MIB is transmitted in the second slot (German: Schlitz) of the first subframe (German: Unterrahmen) in the first four OFDM symbols via 72 sub-carriers. The MIB is transmitted every 10 ms, wherein it can be updated every 40 ms.

As soon as the mobile-terminal device 2 has decoded the MIB, it knows the frequency and the time required to receive SIB1. SIB1 can preferably be updated every 80 ms, being repeated three times between updates. SIB1 contains further information on the frequency and the time which allow the mobile-terminal device 1 to receive the other SIBs.

SIB2 is also of central importance for the LTE base station 1 according to the invention. Information about the uplink bandwidth and information relating to the random-access resources is transmitted in SIB2. In this context, SIB2 is preferably updated every 160 ms. All of the SIBs in this context are copied to so-called SIs (English: system information messages; German: Systeminformationsnachrichten), which correspond to transport blocks, which are transmitted on the DL-SCH. Accordingly, several SIBs which are transmitted with the same periodicity can be copied to one SI. For example, SIB3 and SIB4 are preferably updated every 320 ms, so that both SIBs can be copied to SI-3.

After the mobile-terminal device 2 has evaluated all of the SIBs, it can apply for a random access (English: random access). Such a random access is required, for example, for an initial access to an LTE base station 2, to restore a connection after an error in the transmission path (English: radiolink failure) or in the case of a transfer of an uplink synchronisation to a new LTE base station 2. In this context, the subject matter of the LTE base station 2 according to the invention is to reduce collisions which can occur in the case of a simultaneous initial access to the LTE base station 2 by several mobile-terminal devices 2, as will be explained in greater detail below.

The steps implemented by the mobile-terminal device 1 before it has decoded the MIB and all of the SIBs are indicated in the flow diagram from FIG. 1 with the wording "Sync". Moreover, the transmission of an access preamble (English: random access preamble) from the mobile-terminal device 1 to the LTE base station 2 (step 1) is now implemented. The random access preamble is transmitted on the PRACH (physical random access channel; German: physikalischer Direktzugriffskanal). The frequency of the PRACH and the time within which the random access preamble is allowed to be transmitted on the given frequency are known to the mobile-terminal device 1 from SIB2 and are also referred to as the random-access resource (English: RACH resource). In total, 64 different random access preambles, all of which are orthogonal to one another, are available for each LTE base station 2. The mobile-terminal device 1 randomly selects one of these and transmits it within a random-access resource to the LTE base station 2. The random-access resource of the PRACH preferably provides a bandwidth of 1.08 MHz and provides six resource blocks. Accordingly, a resource block is preferably transmitted on 12 sub-carriers.

In the case of FDD (English: frequency division Duplex; German: Frequenzduplex), the random-access resource is available within a sub-frame (1 ms) every 20 ms through to every millisecond. In the case of TDD, up to six random-access resources are possible within one 10-ms radio frame (German: Funkrahmen). Alongside the actual random access preamble, which preferably provides a sequence length of 0.8 ms, a cyclic prefix (English: cyclic prefix) with a duration of 0.1 ms is also transmitted. The guard interval (English: guard interval) for a geographical coverage range of the LTE base station 2 of 15 km is also 0.1 ms, so that the entire random access preamble can be transmitted within a subframe 1 ms in length. Dependent upon the length of the sequence of the random access preamble, up to 3 ms are necessary, so that the region for the random-access resource must be enlarged.

In view of the orthogonality of the random access preambles, with a different selection of the random access preambles, different mobile-terminal devices 1 can transmit them at the same time on the same random-access resource. The transmission power, with which these random access preambles are transmitted, is determined on the basis of reference signals, which are received by the LTE base station 2.

In a second step, the LTE base station 2 recognises that a mobile-terminal device 1 has made an initial access to it. The LTE base station 2 transmits a message on the DL-SCH, which contains the index of the random access preamble, a permit to use given resource blocks, an ID valid for a limited time, also referred to as a TC-RNTI (English: temporary cell radio-network temporary identifier; German: temporarer Bezeichner für termporäre Funknetzwerkzelle) and a time correction, so that the mobile-terminal device 1 can fully exploit the resource blocks allocated to it at the correct time. Following this, the mobile-terminal device 1 implements a time correction. This is also referred to as the UL timing (English: uplink timing; German: Uplink-Zeitkorrektur). If a mobile-terminal device 1 does not receive an appropriate message, it repeats step 1, wherein the transmission power is optionally increased.

Before the mobile-terminal device can transmit payload data to the LTE base station 2, it still requires an unambiguous identity, a so-called C-RNTI (English: cell radio-network temporary identifier; German: temporarer Funknetzwerkzellenbezeichner). In order to obtain this, a message, which contains, inter alia, the identity of the mobile-terminal device 1 which is used for the recognition of collisions is transmitted in the third step to the LTE base station.

The fourth step is provided for the detection of collisions in the case of an initial access to an LTE base station 2 by a mobile-terminal device 1. The LTE base station 2 transmits a message to the mobile-terminal device 1, wherein the message contains the identity, which was transmitted in the third step from the mobile-terminal device 1 to the LTE base station 2. The mobile-terminal device 1 now compares the identity contained in the message received, with the identity transmitted in step 3. In the case of an agreement, the mobile-terminal device uses the TC-RNTI as the C-RNTI. If the identity received does not agree with the identity transmitted, the mobile-terminal device 2 recognises that a collision has taken place and repeats step 1.

The mobile-terminal device 1 with a valid C-RNTI can then transmit payload data to and receive payload data from the LTE base station 2.

A further possibility for how a collision can be recognised by the LTE base station 2 is achieved according to step 1, if at least two mobile-terminal devices 1 use the same random access preamble. Since the transmission powers of the two mobile-terminal devices 1 are added to one another in the LTE base station 2, the latter can no longer decode the individual random access preambles from the summated signal. Steps 3 and 4 are also referred to as RRC signalling (English: radio resource control; German: Funkressourcenkontrolle).

Figure 2:
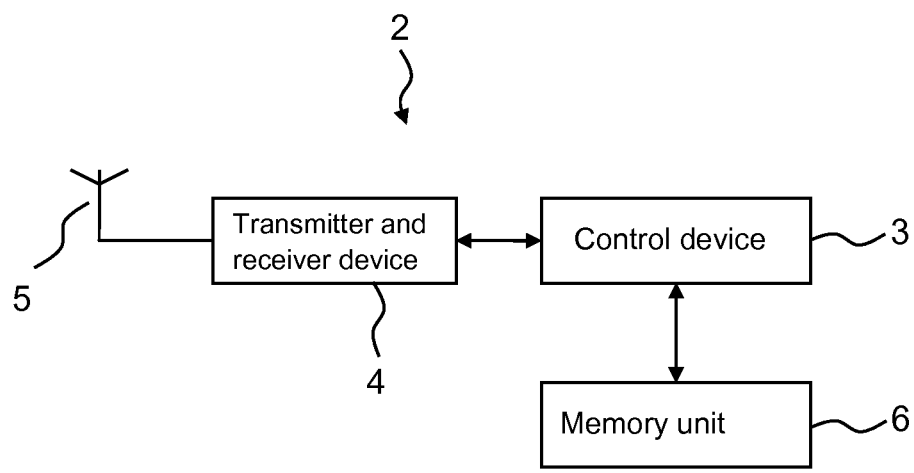
FIG. 2 shows an exemplary embodiment of the structure of the base station according to the invention.

As explained with reference to FIG. 1, the number of random access preambles is restricted, so that the occurrence of collisions becomes more probable, the more mobile-terminal devices 1 seek to connect to the mobile LTE base station 2 for an initial access. FIG. 2 describes an exemplary embodiment of the LTE base station 2 according to the invention, which prevents the occurrence of the collisions described above in advance. The LTE base station 2 according to the invention provides a control unit 3, a transmitter and receiver unit 4, at least one antenna 5 and, optionally, a memory unit 6. In this context, the at least one antenna 5 is connected to the transmitter and receiver unit 4.

The transmitter and receiver unit 4 is connected in turn to the control unit 3. The transmitter and receiver unit 4 receives from the control unit 3 a datastream which it codes and modulates onto the individual sub-carriers. Following this, the datastream is amplified and transmitted via the at least one antenna 5 to the mobile-terminal devices 1, which are disposed in the reception range of the LTE base station 2. At the other end, the transmitter and receiver unit 4 demodulates the data received via the at least one antenna 5 from at least one mobile-terminal device 1 and communicates these data to the control unit 3. The control unit 3 is further connected to a memory unit 6. The connections between the transmitter and receiver unit 4, the control unit 3 and the memory unit 6 are data connections, which can be realised via appropriate and known interfaces. The connection between the antenna 5 and the transmitter and receiver unit 4 is preferably a coaxial connection.

The control unit 3 administers the at least one random-access resource. The term "administer" is understood here to mean that, inter alia, the control unit 3 determines the position of the random-access resource with regard to time and frequency, and also decides on the number of random-access resources. In order to reduce the number of collisions which occur in the case of an initial access to the LTE base station 2 by a plurality of mobile-terminal devices 1, a priority can be adjusted via the control unit 3, which specifies which mobile-terminal device 1 is allowed to connect to the at least one random-access resource. The priority itself can be broadcast by the LTE base station 2 on at least one known channel. For this purpose, a priority class is preferably allocated to the mobile-terminal devices 1. If the priority broadcast by the LTE base station 2 is higher than the priority class to which the mobile-terminal device 1 belongs, the mobile-terminal device 1 does not implement an initial access to the LTE base station 2, as described in FIG. 1. If the priority broadcast by the LTE base station 2 is lower than the priority class to which the mobile-terminal device 1 belongs, the mobile-terminal device 1 is then allowed to connect via an initial access to the LTE base station 2.

For this purpose, the priority broadcast by the LTE base station 2 must already be known to the mobile-terminal device 1, before it selects a random access preamble according to the first step from FIG. 1 and transmits this to the LTE base station 2. The LTE base station 2 according to the invention preferably transmits the priority as a broadcast at a time at which the mobile-terminal device 1 is just synchronising with the LTE base station 2. In view of the fact that the MIB contains only the most necessary information, the priority is preferably integrated in SIB2. For example, three bits can be reserved for this purpose, so that, overall, eight different priorities can be set. A further possibility for communicating the priority to the mobile-terminal device 1 is to generate a new SIB. A 14$^{th}$ SIB, which contains the priority, which specifies the mobile-terminal devices 1 to which the initial access to the LTE base station 2 is allowed, could be generated in addition to the previous 13 known SIBs. A periodicity can be selected for the new SIB14 such that the new SIB14 can be copied to an SI, for example, together with SIBS. As explained in the description for FIG. 1, the SIBs are transmitted on the DL-SCH.

The control unit 3 preferably determines the unused random-access resources and/or determines the number of collisions in the case of an access to at least one random-access resource by the mobile-terminal devices 1. Alongside the unused random-access resources, the control unit 3 can also determine the number of unused random access preambles. From the data obtained, the control unit 3 can then calculate the loading of the random-access resources for the initial accesses by a plurality of mobile-terminal devices 1. The control unit 3 adjusts the priority on the basis of the loading of the random-access resources.

Whenever, by comparison with the free random-access resources, many mobile-terminal devices 1 access the LTE base station 2 and/or many collisions occur, the priority is raised by the control unit 3. By contrast, whenever few mobile-terminal devices 1 access the free random-access resources and/or if comparatively few collisions occur, the priority is lowered by the control unit 3. In this manner, the occurrence of collisions can also be reliably avoided in different loading situations.

If many mobile-terminal devices 1 wish to access the LTE base station 2, it may be meaningful for the control unit 3 to reduce the priority at a given time, especially during the night, and/or for the control unit 3 to increase the priority at a given time, especially during the daytime. Accordingly, it is possible to ensure that, for example, mobile-terminal devices 1 which are allocated to a user can access the LTE base station 2 without restriction, whereas mobile-terminal devices 1 which interact with autonomous systems preferably access the LTE base station 2 during the night, so that the loading can be distributed uniformly over a day.

The control unit 3 can also raise or reduce the priority on the basis of experimental values and/or by evaluating status information. The experimental values contain, for example, the number of initial accesses to an LTE base station by mobile-terminal devices 1 at a given time in the past. From such experimental values, the control unit 3 can, for example, calculate anticipated values and adjust the priority according to the anticipated values. Experimental values for large-scale events, such as sporting events, which take place regularly at the weekend, can be used to adjust the priority according to the anticipated number of visitors at the beginning of the large-scale event. Moreover, at the turn of the year, experimental values which have been recorded in previous years can be used to increase the priority accordingly, so that the probability of collisions is reduced in the case of an increased number of mobile-terminal devices.

The status information contains details, for example, about the LTE base station 2 itself. If the LTE base station 2 is restarted, and if the LTE base station 2 is the only base station responsible for the supply of mobile-terminal devices 1 within a given region, it can be anticipated that, after a restart of the LTE base station 2, all of the mobile-terminal devices 1 disposed in the coverage range of the LTE base station would wish to log on to the LTE base station 2 again. The status information also registers power failures in individual districts of the town, because in this case, a plurality of mobile-terminal devices 1 would need to log on to the LTE base station 2 after the recovery of the power supply. By evaluating such status information, the priority can be increased in the short-term, thereby reducing the probability for the occurrence of collisions.

Furthermore, the control unit 3 allows the priority class of a mobile-terminal device 1 to be varied by the LTE base station 2, as soon as the mobile-terminal device 1 is connected to the LTE base station 2. Accordingly, even with mobile-terminal devices 1 which are allocated to a user, it is possible to adjust different priority classes. If a user's mobile-terminal device 1 has managed to log on to the LTE base station 2 during a large-scale event, the priority class of the mobile-terminal device 1 can be changed, preferably reduced, after the successful logon procedure. This increases the probability that another mobile-terminal device 1 which could not log on to the LTE base station 2 during the preceding large-scale event, can log on to the LTE base station 2 more rapidly in the case of a subsequent large-scale event. This means that the probability for a successful initial access by all mobile-terminal devices 1 allocated to a user, is approximately equal. After a given period of time, the priority class is reset again.

Mobile-terminal devices 1, which interact directly with the user or are allocated to the user, are preferably assigned to a relatively higher priority class than mobile-terminal devices 1 which are used for M2M communication. Accordingly, potentially disturbing waiting times before a successful initial access to the LTE base station 2 by the mobile-terminal device 1 can be avoided. Mobile-terminal devices 1 which are used for M2M communication, for example, in automatic ticket machines, are not generally regarded as so critical with regard to time as mobile-terminal devices 1 which are allocated to a user. Furthermore, the control unit 3 allows the number of random-access resources to be raised and/or reduced. In the case of a use of an FDD, a random-access resource can be found every millisecond, up to one every 20 ms. If a plurality of mobile-terminal devices 1 suddenly implement an initial access to the LTE base station 2, on the one hand, the priority, and on the other hand, the number of random-access resources can be increased, in order to reduce the number of collisions at the same time as increasing the number of successful initial accesses by the plurality of mobile-terminal devices 1. If only a few mobile-terminal devices 1 access the LTE base station 2, the control unit 3 can reduce the number of random-access resources. This makes more bandwidth available for data transmission.

If the priority is transmitted via SIB2, with a period of 160 ms, the priority can be varied approximately seven times per second, which is sufficient for all applications.

Figure 3:
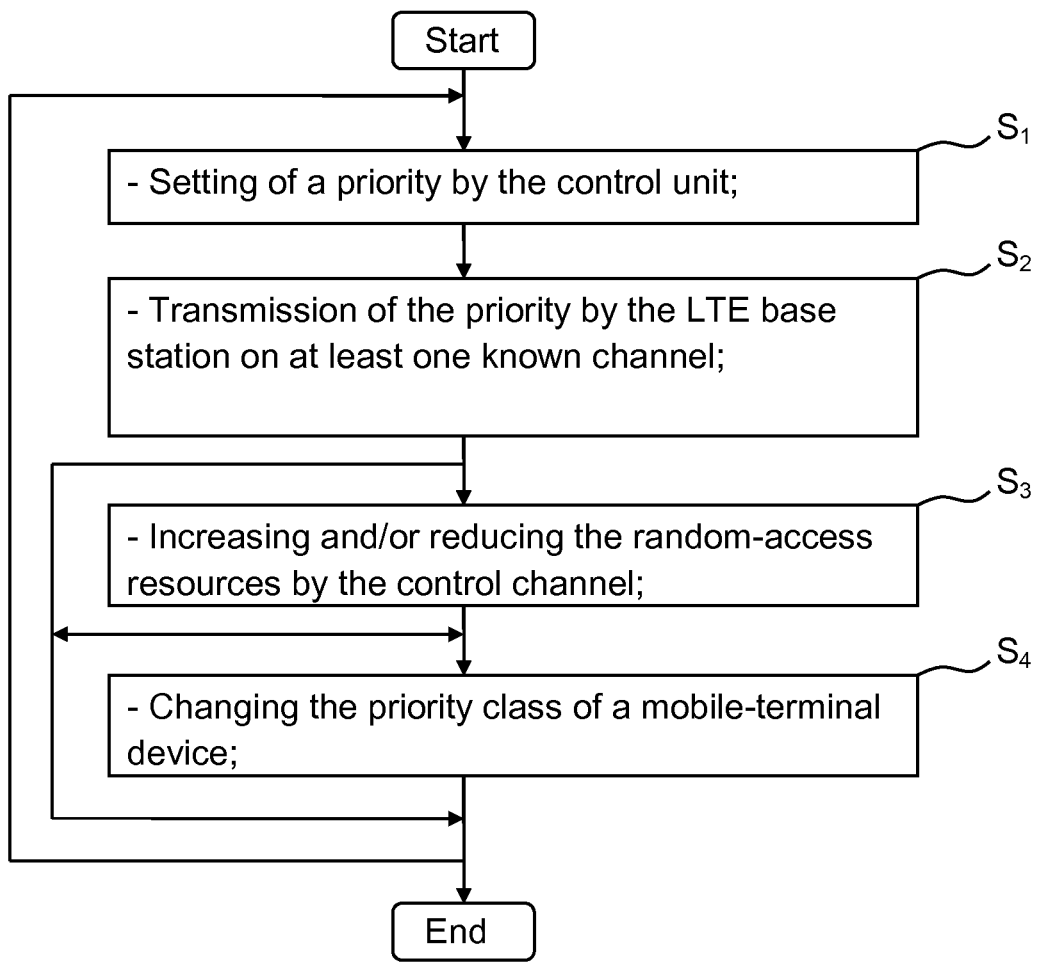
FIG. 3 shows an exemplary embodiment of a flow chart of the method according to the invention for setting a priority of the LTE base station.

FIG. 3 shows an exemplary embodiment of a flow diagram of the method according to the invention for the LTE base station 2 for adjusting a priority. In a first method step $S_1$, the priority is set by the control unit 3. In this context, the priority specifies which mobile-terminal device 1 is allowed to connect to the at least one random-access resource. In principle, the priority can be adjusted with any required accuracy. However, experiments have shown that it is sufficient if eight different steps are available for the priority, so that a total of 3 bits are required. Dependent upon the application, fewer or more priority steps may be necessary, so that less than or more than 3 bits may be required.

In a second method step $S_2$, the priority is broadcast by the LTE base station 2 on at least one known channel. The wording "at least one known channel" should be understood in the sense that the mobile-terminal device 1 must be capable of recognising the priority in order to do without an initial access to the LTE base station 2 if required. In this context, the priority is preferably transmitted via a broadcast.

Furthermore, in an optional third method step $S_3$, the number of random-access resources can be raised and/or reduced by the control unit 3. The time required before the successful initial access can therefore be reduced if, for example, in spite of an increase of the priority, a plurality of mobile-terminal devices 1 which are allocated to a user, implement an initial access to an LTE base station 2.

Optionally, in a fourth method step $S_4$, the priority class of a mobile-terminal device 1 can be varied by the control unit 3, so that the mobile-terminal device 1 is connected to the LTE base station 2. Accordingly, mobile-terminal devices 1 which are allocated, for example, to different users, may require the same time on average for a successful initial access to an LTE base station 2. If an initial access by a mobile-terminal device 1 which is allocated to a user has been successfully implemented, the priority class which is allocated to the mobile-terminal device 1 can be lowered, so that, in the case of another initial access by the mobile-terminal device 1, another mobile-terminal device 1, which was previously disadvantaged, takes precedence. In this manner, mobile-terminal devices 1 which are allocated, for example, to the emergency services, can also very simply be prioritised over other mobile-terminal devices 1. After the optional method step $S_4$ has been completed, method step $S_1$ can again be performed, in that the control unit 3 resets a new priority for altered conditions.

Figure 4:
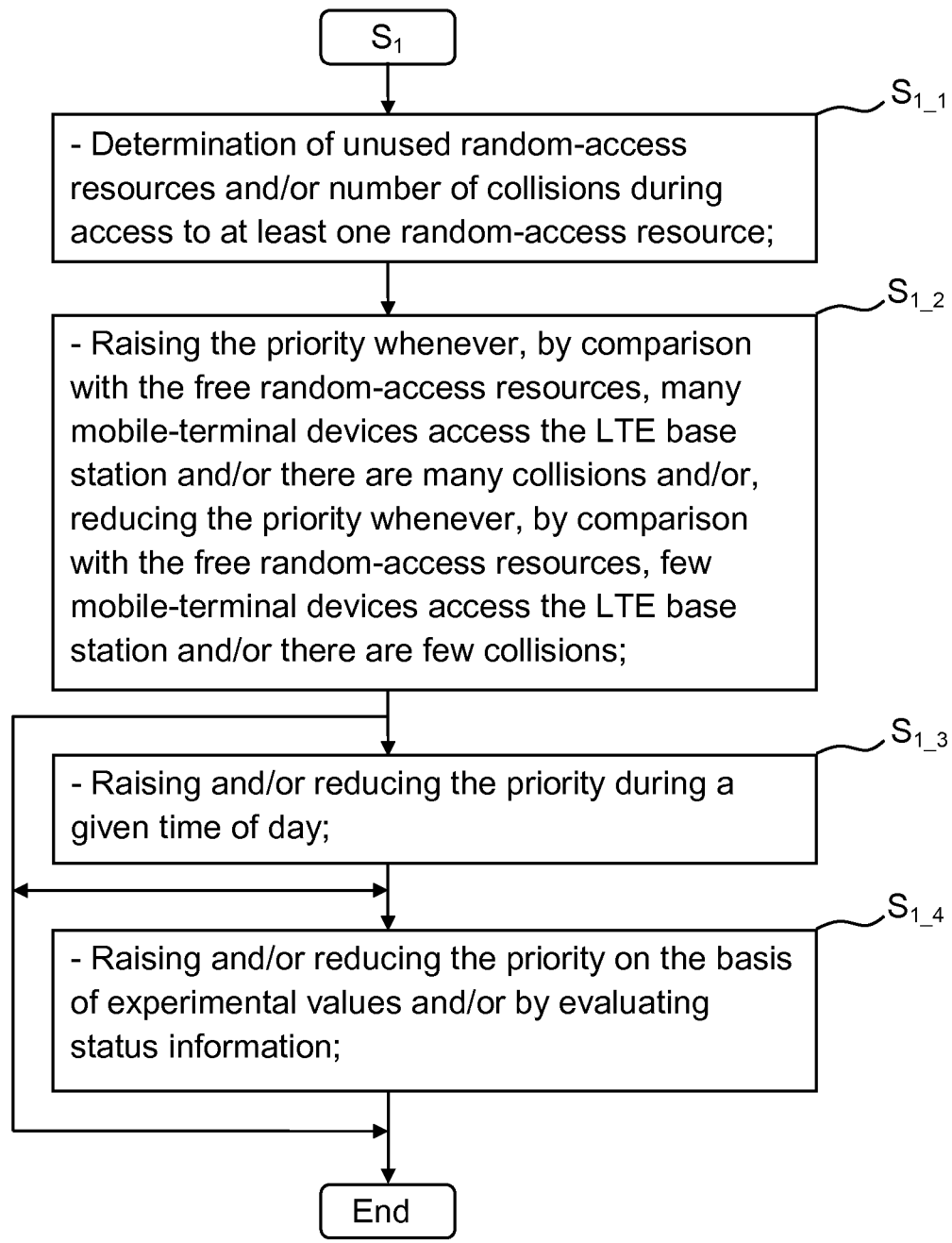
FIG. 4 shows an exemplary embodiment of the method according to the invention which explains the adjustment of the priority in greater detail.

FIG. 4 shows an exemplary embodiment of the method according to the invention for the LTE base station 2, which explains the adjustment of the priority in greater detail. The flow diagram from FIG. 4 thus explains method step $S_1$ in greater detail. Method step $S_1$ contains a method step $S_{1\_1}$ in which the number of unused random-access resources and/or, in the case of an access to the at least one random-access resource, the number of collisions is determined by the control unit 3. The number of unused random-access resources also includes the number of unused random access preambles.

In a further method step $S_{1\_2}$, the priority is increased by the control unit 3, whenever, by comparison with the free random-access resources, many mobile-terminal devices 1 access the LTE base station 2 and/or whenever there are many collisions. By contrast with this, the priority is lowered by the control unit 3 whenever, by comparison with the free random-access resources, few mobile-terminal devices 1 access the LTE base station 2 and/or whenever there are few collisions. The wording "many collisions" and the wording "few collisions" should be understood in the sense that the number of collisions is compared with a freely selectable threshold value. The threshold value includes, for example, the size of the region which is covered by the LTE base station 2, but also the average number of active mobile-terminal devices 1. The wording "many mobile-terminal devices 1" and the wording "few mobile-terminal devices 1" should be understood in the sense that, if, for example, 90% of the free random-access resources are occupied, the priority is automatically increased, and if fewer than, for example, 90% of the random-access resources are occupied, the priority is lowered.

In a further optional method step $S_{1\_3}$, the priority is reduced by the control unit 3 at a given time of day, especially during the night, and/or raised by the control unit 3 at a given time of day, especially during the daytime. Accordingly, the initial accesses by mobile-terminal devices 1 which belong to a low priority class, for example, mobile-terminal devices 1 which are used for M2M communication, are displaced to the night-time. Automatic drinks dispensers which communicate filled levels to a central control system need not necessarily access the LTE base station 2 at peak times. Accordingly, a uniform loading distribution of the LTE base station 2 over the entire day is achieved.

Optionally, method step $S_1$ can contain a further method step $S_{1\_4}$. Within this method step, the priority is raised and/or reduced by the control unit 3 on the basis of experimental values and/or by evaluating status information. It is particularly advantageous that preceding events, which may provide similarities with future events, can also be taken into consideration by the control unit 3. These experimental values are stored in the memory unit 6. It is also possible for the experimental values to originate from other LTE base stations 2, for example, if large-scale events such as concerts are staged in different cities with a time interval. The status information relate to power failures and/or the restarting of the LTE base station 2. Especially after such an incident, a plurality of mobile-terminal devices 1 will attempt to re-establish contact with the LTE base station 2 via an initial access.

Figure 5:
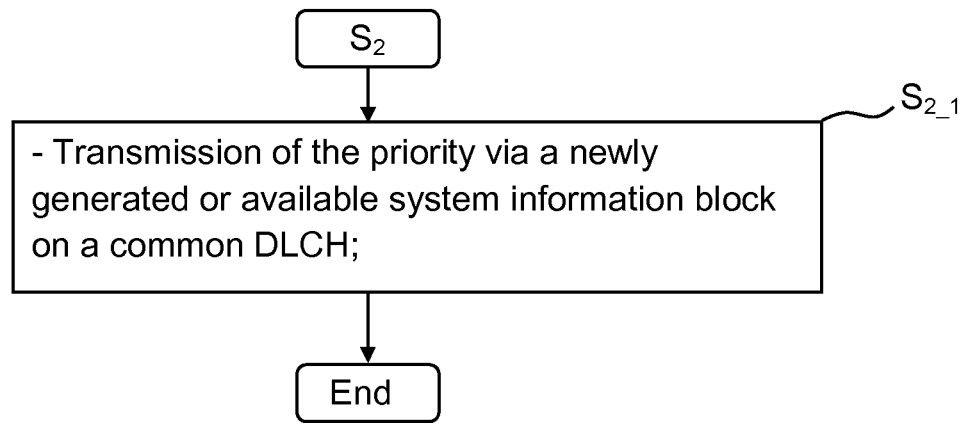
FIG. 5 shows a further exemplary embodiment of a flow diagram for the method according to the invention which explains the broadcast of the priority in greater detail.

FIG. 5 shows a further exemplary embodiment of a flow chart for the method according to the invention of the LTE base station 2, which explains the broadcast of the priority in greater detail. FIG. 5 shows method step $S_{2\_1}$, which explains a possibility for describing method step $S_2$ in greater detail. In this method step $S_{2\_1}$, the priority is broadcast via an existing or newly created SIB, which is transmitted on a common downlink channel. By preference, SIB2 is expanded, so that it contains, for example, three additional bits, in order to adjust eight different priorities. However, it is also possible to create a new SIB, which is transmitted at regular intervals corresponding to the already existing SIBs on the common downlink channel. For example, an SIB14 can be created for this purpose. Because it can be assumed that the priority need not be varied several times within one second, it is sufficient if the period in which the newly created SIB is broadcast is large, in order to save valuable resources.

Within the framework of the invention, all of the features described and/or illustrated can be combined with one another as required. The standard elaborated on the basis of the 3GPP for LTE is adopted in full within the scope of the present description.

The invention claimed is:

1. A method for reducing collisions in a case of an access by a plurality of mobile-terminal devices to an LTE-base station which provides a control unit, wherein the control unit administers at least one random-access resource, and wherein a priority class is allocated to the plurality of mobile-terminal devices, the method comprising:
 setting, by the control unit, a priority which specifies which mobile-terminal device is allowed to connect to the at least one random-access resource; and
 broadcasting the priority by the LTE-base station on at least one known channel,
 wherein a mobile terminal device does not implement an initial access to the LTE-base station whenever the priority broadcast by the LTE-base station is higher than the priority class of the mobile terminal device, and
 wherein on the basis of the priority received, the plurality of mobile-terminal devices check whether the plurality of mobile-terminal devices are allowed to access the at least one random-access resource.

2. The method according to claim 1, further comprising:
 determining unused random-access resources by the control unit or determining a number of collisions in a case of an access to the at least one random-access resource.

3. The method according to claim 1, further comprising:
 raising the priority whenever, by comparison with free random-access resources, many mobile-terminal devices access the LTE-base station or there are many collisions, or
 lowering the priority whenever, by comparison with the free random-access resources, few mobile-terminal devices access the LTE-base station or there are few collisions.

4. The method according to claim 1, further comprising:
 broadcasting the priority via an existing or newly created system information block, which is transmitted on a common downlink channel.

5. The method according to claim 1, further comprising:
 lowering the priority at a given time of day, especially during the night, or raising the priority at a given time of day, especially during the daytime.

6. The method according to claim 1, further comprising:
 raising or lowering the priority on a basis of experimental values or by evaluating status information.

7. The method according to claim 1, further comprising:
 increasing or reducing the random-access resources by the control unit.

8. The method according to claim 1, further comprising:
 altering a priority class of a mobile-terminal device as soon as it is connected to the LTE-base station.

9. The method according to claim 1, wherein mobile-terminal devices which interact directly with a user are allocated to a higher priority class than mobile-terminal devices used for machine-to-machine communication.

10. The method according to claim 6, wherein the status information relates to power failures and/or restarting of the LTE-base station.

11. An LTE-base station for reducing collisions in a case of an access by a plurality of mobile-terminal devices to the LTE-base station comprising:
 a control unit configured to administer at least one random-access resource,
 wherein the LTE base station is configured to allocate a priority class to the plurality of mobile-terminal devices,
 wherein a priority which specifies which mobile-terminal device is allowed to connect to the at least one random-access resource, is adjusted by the control unit, and
 wherein the priority is broadcast by the LTE-base station on at least one known channel,
 wherein on the basis of the priority received, the plurality of mobile-terminal devices check whether the plurality of mobile-terminal devices are allowed to access the at least one random-access resource, and
 wherein the LTE-base station is configured to cause the mobile-terminal device not to implement an initial access to the LTE-base station whenever the priority broadcast by the LTE-base station is higher than the priority class of the mobile-terminal device.

12. The LTE-base station according to claim 11, wherein unused random-access resources or a number of collisions during the access by the mobile-terminal devices to at least one random-access resource is determined by the control unit.

13. The LTE-base station according to claim 11,
 wherein the priority is raised by the control unit whenever, by comparison with free random-access resources, many mobile-terminal devices access the LTE-base station, or many collisions occur, or
 wherein the priority is lowered by the control unit whenever, by comparison with the free random-access resources, few mobile-terminal devices access the LTE-base station, or few collisions occur.

14. The LTE-base station according to claim 11, wherein the priority is transmitted by the LTE-base station via an existing or newly created system information block on a common downlink channel.

15. The LTE-base station according to claim 11, wherein the priority is reduced by the control unit at a given time, especially during the night, or the priority is raised by the control unit at a given time, especially during the daytime.

16. The LTE-base station according to claim 11, wherein the control unit raises or reduces the priority on a basis of experimental values or by evaluating status information.

17. The LTE-base station according to claim 11, wherein the priority class of a mobile-terminal device is altered by the LTE-base station as soon as it is connected to the LTE-base station.

18. The LTE-base station according to claim 11, wherein the random-access resources are raised or reduced by the control unit.

19. The LTE-base station according to claim 11, wherein mobile-terminal devices which interact directly with a user are allocated to a higher priority class than mobile-terminal devices which are used for machine-to-machine communication.

20. The LTE-base station according to claim 16, wherein the status information relates to power failures or restarting of the LTE-base station.

\* \* \* \* \*